US008460078B2

(12) United States Patent
Moore et al.

(10) Patent No.: US 8,460,078 B2
(45) Date of Patent: Jun. 11, 2013

(54) FANTASY GAME SYSTEM AND METHOD FOR PLAYER SELECTION AND SCORING

(76) Inventors: Gearoid E. Moore, Vienna, VA (US); Vito Anthony Favazza, III., University City, MO (US); Andrew J. Norman, Herndon, VA (US)

( * ) Notice: Subject to any disclaimer, the term of this patent is extended or adjusted under 35 U.S.C. 154(b) by 135 days.

(21) Appl. No.: 12/965,578

(22) Filed: Dec. 10, 2010

(65) Prior Publication Data
US 2012/0149473 A1 Jun. 14, 2012

(51) Int. Cl.
*A63F 13/00* (2006.01)

(52) U.S. Cl.
USPC ........ 463/9; 463/40; 463/41; 463/42; 700/91; 700/92; 700/93

(58) Field of Classification Search
USPC ................. 463/9, 40–42; 700/91–93
See application file for complete search history.

(56) References Cited

U.S. PATENT DOCUMENTS

| | | | |
|---|---|---|---|
| 2006/0183548 A1* | 8/2006 | Morris et al. | 463/42 |
| 2006/0252476 A1* | 11/2006 | Bahou | 463/4 |
| 2007/0203591 A1* | 8/2007 | Bowerman | 700/90 |
| 2007/0207845 A1* | 9/2007 | Gottlieb | 463/9 |
| 2007/0243918 A1* | 10/2007 | Wojewoda et al. | 463/9 |
| 2008/0125228 A1* | 5/2008 | Ware et al. | 463/42 |
| 2010/0137057 A1* | 6/2010 | Fleming | 463/25 |

OTHER PUBLICATIONS

"Fantasy Moto X: MotoXDream Fantasy League Rules", Nov. 21, 2002, MotoXDream, <http://web.archive.org/web/20021121202643/http://www.motoxdream.com/rules.asp>.*
MotoXDream, "Fantasy Moto X: MotoXDream Fantasy League Rules", Apr. 2009, <http://web.archive.org/web/20090408124727/http://www.motoxdream.com/rules.asp>.*

* cited by examiner

*Primary Examiner* — Ronald Laneau
*Assistant Examiner* — Justin Myhr

(57) ABSTRACT

A fantasy sports game device includes a memory configured to store a set of instructions and a processor configured to execute the set of instructions. The set of instructions cause the processor to receive a first fantasy lineup for a fantasy team. The fantasy lineup includes one or more players. The instructions further cause the processor to receive statistical information relating to each one of the players whereby the processor calculates a player point total for each player based at least in part on the received statistics. A fantasy team score for the first fantasy lineup may then be calculated by adding together the player point total for each player. The instructions further cause the processor to receive a subsequent fantasy lineup for a fantasy team where the subsequent lineup comprises one or more players, wherein none of the players of the first lineup are included in the subsequent lineup.

23 Claims, 2 Drawing Sheets

FANTASY GAME SYSTEM AND METHOD FOR PLAYER SELECTION AND SCORING

BACKGROUND OF INVENTION

This application relates generally to fantasy sports games. More specifically, this application relates generally to fantasy sports games and methods whereby the fantasy game is playable over the course of a predetermined finite period such as a real-life season, playoff or tournament.

SUMMARY

Fantasy sports, and fantasy football in particular, has blossomed into a multi-billion dollar industry. Fantasy sports games typically involve creating a league of friends, family and/or acquaintances where each person acts as a "general manager" of a respective fantasy team. Each fantasy team is populated with several fantasy players where each fantasy player corresponds to an individual, real-life athlete participating in a real-life sports game or event. The statistics generated by the real-life sports players are converted to fantasy points whereby the points are assigned to the fantasy team(s) owning each particular player. These fantasy points may then be used to calculate team scores for each fantasy team. In most instances, the team with the most fantasy points wins the fantasy contest.

Despite the existence of football or other sports playoffs (e.g., NFL playoffs) or tournaments such as the NCAA Basketball Tournament, most fantasy seasons are concluded well before the real-life playoffs. Thus, for several weeks of highly entertaining and competitive games and sporting events at the most important time of the sports season, very few fantasy games are played. Therefore, there exists a significant need for an improved fantasy game that is playable over the course of a predetermined time period such as that of playoffs (e.g., football playoffs) or during a tournament such as NCAA Basketball Tournament or the FIFA World Cup. Such a fantasy game may be applicable to any suitable event with a predetermined time period of games and not limited solely to football.

This application discloses a fantasy sports game device comprising: a memory configured to store a set of instructions; and a processor configured to execute the set of instructions, wherein the set of instructions cause the processor to: receive a first fantasy lineup for a fantasy team, the fantasy lineup comprising one or more players; receive statistical information relating to each one of the players; calculate a player point total for each player based at least in part on the received statistical information; calculate a fantasy team score for the first fantasy lineup by adding together the player point total for each player; and receive a subsequent fantasy lineup for a fantasy team, the subsequent fantasy lineup comprising one or more players, wherein none of the players of the first fantasy lineup are included in the subsequent fantasy lineup.

This application also discloses a fantasy sports game system comprising: one or more participant terminals operable to act as a client on a network; a computer operable to act as a server on the network and to communicate with each of the participant terminals over the network, the computer comprising: a memory configured to store a set of instructions; and a processor configured to execute the set of instructions, wherein the set of instructions cause the processor to: receive a first fantasy lineup for a fantasy team from at least one participant terminal, the fantasy lineup comprising one or more players; receive statistical information relating to each one of the players; calculate a player point total for each player based at least in part on the received statistical information; and calculate a fantasy team score for the first fantasy lineup by adding together the player point total for each player; and receive a subsequent fantasy lineup for a fantasy team from at least one participant terminal, the subsequent fantasy lineup comprising one or more players, wherein none of the players of the first fantasy lineup are included in the subsequent fantasy lineup.

This application further discloses a fantasy sports game system comprising: one or more participant terminals operable to act as a client on a network; a computer operable to act as a server on the network and to communicate with each of the participant terminals over the network, the computer comprising: a memory configured to store a set of instructions; and a processor configured to execute the set of instructions, wherein the set of instructions cause the processor to provide a first list of available players to at least one of the participant terminals; receive a first fantasy lineup for a fantasy team from at least one participant terminal, the fantasy lineup comprising one or more players selected from the first list of available players; calculate a first score for the fantasy lineup comprising points, wherein the points are based at least in part on statistical information related to each selected player; provide a subsequent list of available players to at least one of the participant terminals, wherein the subsequent list of available players does not include players from the received first fantasy lineup; and receive a subsequent fantasy lineup for the fantasy team from at least one participant terminal, the fantasy lineup comprising one or more players selected from the subsequent list of available players.

BRIEF DESCRIPTION OF THE DRAWINGS

The drawings, when considered in connection with the following description, are presented for the purpose of facilitating an understanding of the subject matter sought to be protected.

DETAILED DESCRIPTION

Figure 1:
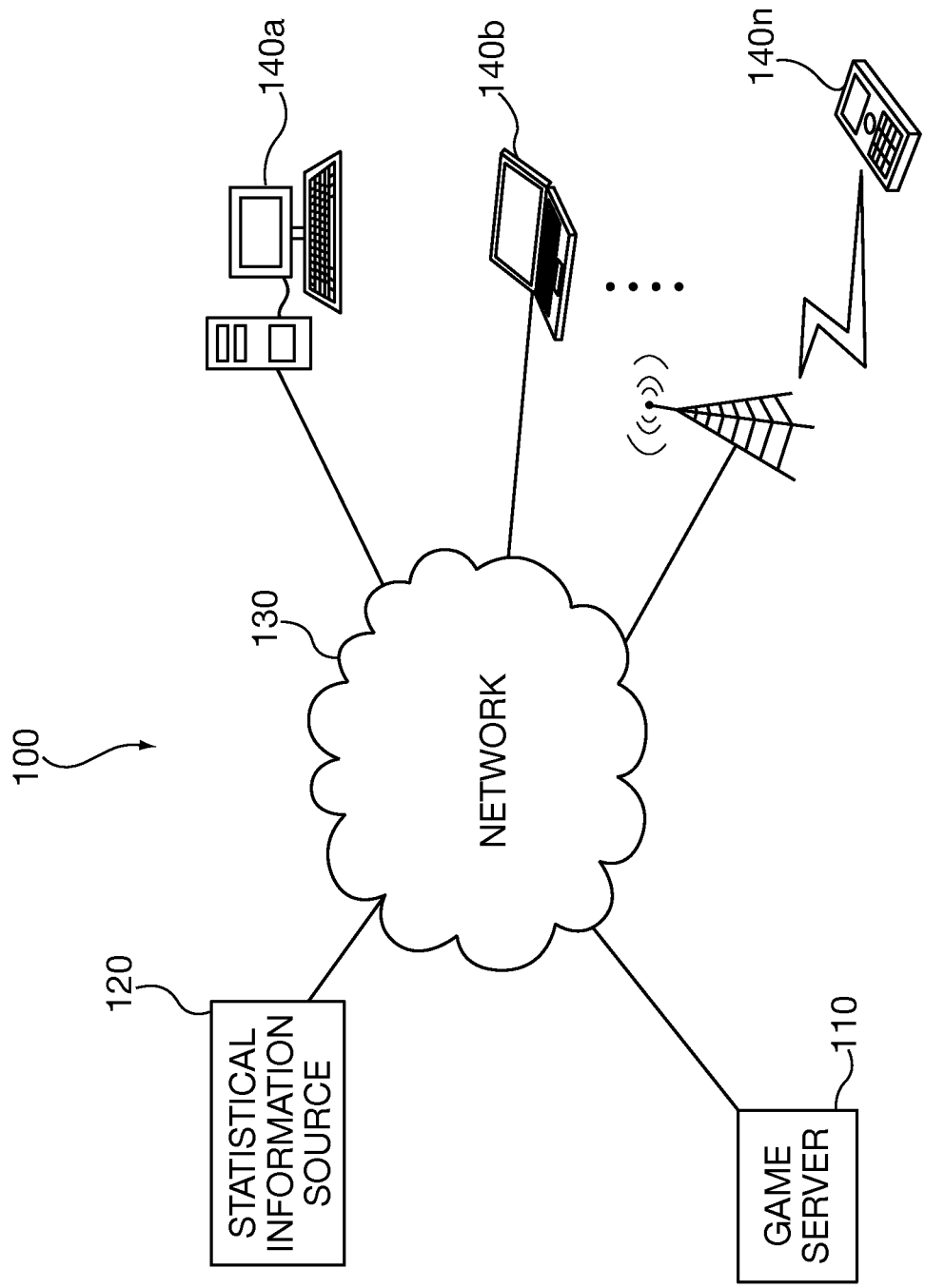
FIG. 1 is an illustration of a fantasy sports network of a first embodiment of the fantasy football system disclosed herein.

Referring now to FIG. 1, a fantasy sports game system 100 is depicted. The system 100 may include a server 110, a statistical information source 120, a communications network 130, and one or more participant terminals 140a-140n (collectively 140). The different elements and components of the system 100 may communicate with one another using wireless communications or hardwired connections, such as fiber optics, cable, DSL, telephone lines, and other similar connections.

The communications network 130 may include any number of networks capable of providing communications between the server 110, statistical information source 120, and terminals 140. For example, the communications network may be one or more, or any combination of, wireless networks, data or packet networks, publicly switched telephone networks (PSTN), etc.

The participant terminals 140 may include any suitable device operable to act as a client on a network. Illustrative terminals 140 include, but are not limited to, personal computers, desktop computers, laptop computers, servers, or any suitable telecommunications device, including, but not limited to, VoIP telephones, smart telephones or wireless devices, such as cellular telephones, personal digital assistants (PDA), communications enabled mp3 players, etc. Each terminal 140 may be configured to transmit and/or receive information to and/or from the server 110, the statistical information source 120 and/or other participant terminals 140.

The statistical information source 120 may be any suitable source of statistical information relevant to the fantasy game played. The statistical information source 120 may be a statistical repository maintained by a sports league, for example, the National Football League (NFL), National Collegiate Athletic Association, FIFA World Cup etc. Alternatively, the statistical information source 120 may be a third-party source, such as a news website STATS, Inc. headquartered in Northbrook, Ill., or any other suitable source of statistical information. In the illustrative embodiment, the statistical information source 120 includes statistical information related to one or more real-life athletes participating in one or more real-life games; however, it will be appreciated that the statistical information source 120 may include statistical information related to real-life and/or virtual athletes as well as any real-life and/or virtual athletic event.

The server 110 may be any server, computer or device configured to process commands from the participant terminals 140. For example, the server 110 may be operable to receive a starting lineup for one or more fantasy teams from one or more terminals 140. Each lineup may correspond to a particular fantasy team whereby each fantasy team competes with one or more other fantasy teams in a fantasy competition. The fantasy competition may be a fantasy league, a single fantasy game, a weekly fantasy contest, a fantasy tournament, or any other suitable fantasy sports competition. In one embodiment, a single fantasy team may be registered with a plurality of leagues whereby the team's performance is reflected in each league, thus allowing a user to participate in multiple leagues without requiring additional time or effort to choose new teams. For example, it is contemplated by the inventors that a user would be able to visit just one website, pick a team, pick the leagues it would like to join (where the leagues would all be played based on the method of play presented herein), and then simply click one button for that team to be played in the various leagues it has selected. This same concept would be available for each subsequent game or round. This would allow the user to easily participate in a variety of leagues, where each league may be comprised of different individuals that may or not be directly related to the user, for example: office co-workers, family, friends, classmates, or different leagues of random individuals.

Each fantasy lineup may include one or more fantasy players associated therewith. Each player may be associated with a real-life athlete participating in a real-life athletic event, such as a football game. However, it will be appreciated that each player may be associated with real-life and/or virtual athletes as well as any real-life and/or virtual athletic event. In one embodiment, at least one fantasy player is associated with an athlete playing at least one position on an offensive squad of a football team. Suitable offensive squad positions may include, without limitation, one or more quarterbacks, running backs, wide receivers, tight ends, split ends, fullbacks, tailbacks, and offensive linemen. Also, in one embodiment, at least one fantasy player is associated with a defensive and/or special teams squad of a football teams and/or an athlete playing at least one position on a defensive squad of a football team. Suitable defensive squad positions may include, without limitation, one or more safeties, cornerbacks, linebackers, defensive tackles, defensive ends, and defensive linemen.

The server 110 may also be configured to receive statistical information from the statistical information source 120, calculate player point totals therewith, and calculate a fantasy team score for each fantasy team. The server 110 may receive statistical information for each fantasy player from the statistical information source 120. The received statistical information may include, without limitation, yardage obtained by at least one of the fantasy players involved in at least one football game, touchdowns scored, etc. Suitable yardage may include, without limitation, passing yardage, rushing yardage, receiving yardage, special teams yardage, total team yardage and return yardage. Return yardage may include, without limitation, yardage obtained during a kick or punt return or yardage obtained by a defensive player after a turnover.

Once the server 110 has received the relevant statistical information from the statistical information source 120, the server 110 may calculate a player point total for each fantasy player based on the statistical information. In one embodiment, for each fantasy player, every 25 yards passing is assigned 1-point, every 10 yards rushing or receiving is assigned 1-point, and every touchdown is assigned 6-points. It will be appreciated that scoring systems employing passing yardage, rushing yardage, receiving yardage, touchdowns, turnovers, etc. are well known in the art and the present system is not limited to the forgoing illustrative scoring system. In addition, it will be appreciated that a bonus scoring system may be employed. In one embodiment, a bonus point system may be based on a formula and predetermined percentage allocation among predetermined strategic categories that may show managers to be especially keen at making smart decisions or selecting a quality fantasy lineup. For example, the formula may consistent of a weighted average of factors. Illustrative factors may include, without limitation: picking players from the team that loses (e.g., with a possibility of greater points for picking an upset according to suitable betting odds or any other suitable determination), actual accrued points by players, positional scoring (e.g., reward an unforeseen high scoring game from a position or player that does not general score a lot of points based on historical league position scores (e.g., if more than two standard deviations from average for the position or any other suitable determination)), boldness in player choice (e.g., choosing a player further down a depth chart of a given team and choosing said player early on in the playoffs or the like), etc. Also, an inverse of the forgoing may be applied whereby negative points may be accrued for poor decisions. It will be appreciated that any other suitable bonus point system may be employed and remain within the scope of the present disclosure. For example, and without limitation, players being penalized during an event may receive negative points for such penalties, players against whom a penalty was committed may receive bonus points, players breaking pre-existing league records may receive bonus points, players scoring later into a playoff or later in the fantasy contest may receive bonus points for such scoring, etc. Additional bonus scoring systems will be apparent to those skilled in the art and are expressly contemplated herein and the present disclosure is in no way limited to the illustrative bonus scoring systems.

As will be discussed further below, the server may be configured to receive fantasy lineups for one or more fantasy teams, wherein each fantasy lineup includes one or more players. The fantasy lineup for each team will be changed at predetermined intervals (e.g., weekly) wherein players previously used are not eligible for re-use in a subsequent lineup. In one embodiment, a winner is declared at the end of each predetermined interval. In an alternative embodiment, the point totals for a plurality of pre-determined intervals are added together whereby team having the greatest point total is deemed the winner. By way of illustration and without any limitation, a fantasy game may be played over the course of an NFL playoff period whereby each fantasy team submits a new fantasy lineup for each round of the playoffs. Players used for any given round (e.g., wild-card round) are ineligible for use in any subsequent round (e.g, divisional round, conference championship, Super Bowl, etc.). The team having the most points at the end of the NFL playoffs may be deemed the winner. It will, however, be appreciated that the present disclosure is not limited in any way to the NFL and/or the NFL playoffs and has applicability to playoffs or tournaments of other sports.

In one embodiment, the server 110 may permit a user to provide a replacement lineup comprising at least one replacement player after a lineup is received and prior to the receipt of statistical information. In one embodiment, one or more players from the lineup are replaced by one or more replacement players during a real-time sporting event upon which the collected statistics and fantasy points are based. In one embodiment, the statistics of the players from the original lineup are only considered for the purposes of determining a fantasy score up until a corresponding replacement player is received by the server and any statistics accrued by the original player after receipt of the replacement player may then be ignored when calculating a fantasy score. The statistics of the replacement player prior to receipt of the replacement player by the server may be ignored and only statistics obtained after receipt of the replacement player by the server considered for the purposes of calculating a score. For example, and without limitation, a user includes a first quarterback in a lineup. The user provides a replacement quarterback to the server after one quarter of play by the first quarterback. The replacement quarterback completes at least three quarters of a football game. In calculating a score, only the statistics corresponding to the one quarter of play by the first quarterback are considered. Likewise, only statistics corresponding to the three quarters of play by the replacement quarterback are considered in calculating a score, and any additional statistics by the replacement quarterback are ignored. It will be appreciated that the quarters of play (or any other suitable time demarcation) need not be running concurrently or consecutively. For example, the first quarterback may play the first quarter of the football game and the replacement quarterback may complete any three quarters for consideration (e.g., the first three quarters, the final three quarters, etc.). The choice of which time period(s) are considered for the replacement player may be predetermined in the game set-up or selected by a user. Also, the first quarterback may be competing in an earlier game and the replacement quarterback playing in a later football game (either later in the same day as the first game, a day after the first game, etc). It will be appreciated that the forgoing is only illustrative in nature and any system permitting a user to change players during a real-time event is expressly considered. Further, the player from the original lineup as well as the replacement player may be ineligible for use in a subsequent lineup by the user.

In the illustrative embodiment, the server 110 includes a memory and a processor to accommodate the forgoing. However, it will be appreciated that the forgoing may be implemented in hardware, software, or a suitable combination of hardware and software, and which can be one or more software systems operating on a general purpose server platform. As used herein, a hardware system can include discrete semiconductor devices, an application-specific integrated circuit, a field programmable gate array or other suitable devices. A software system can include one or more objects, agents, threads, lines of code, subroutines, separate software applications, user-readable (source) code, machine-readable (object) code, two or more lines of code in two or more corresponding software applications, databases, or other suitable software architectures. In one exemplary embodiment, a software system can include one or more lines of code in a general purpose software application, such as an operating system, and one or more lines of code in a specific purpose software application. Alternatively, the functions of the server may be performed by a human user acting as a fantasy commissioner for a fantasy contest, fantasy league, etc.

Figure 2:
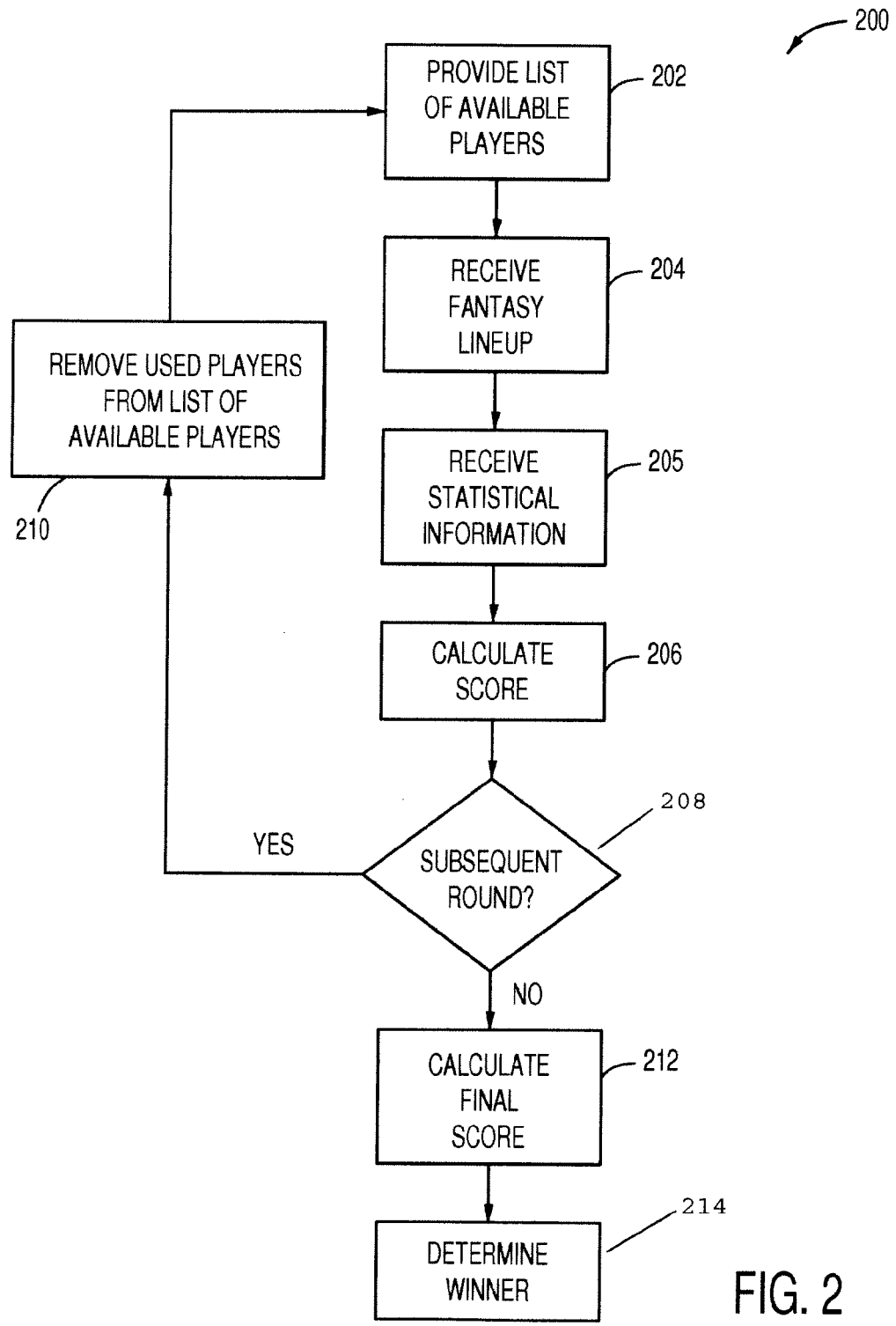
FIG. 2 is a flow diagram of an illustrative process for playing a fantasy football game.

Referring now to FIG. 2, a flowchart 200 of a method for playing a fantasy football game is shown. The method may be implemented by a server, wireless device, VoIP telephone, other advanced intelligence network device, or any combination thereof, generally referred to herein as the "device." Alternatively, the method may be performed by a human user acting as a fantasy commissioner of a fantasy contest, fantasy league, etc. While the illustrative embodiment employs the game of football, it will be appreciated that this is for illustrative purposes only and that any suitable event may be employed and remain within the scope of the present disclosure.

The method 200 begins with providing a list of football players available to each user (step 202) from which each user may construct a fantasy lineup. The list of players may include only players presently participating in the sport. For example, if the fantasy football game were played over the course of the NFL playoffs, only players on teams presently in the playoffs may be provided. While the illustrative embodiment provides a game played over the course of the NFL playoffs, it will be appreciated that the game may be played over any pre-determined period of time and remain within the scope of the present disclosure.

The fantasy lineups for each team may then be received (step 204) wherein each lineup comprises a plurality of players. In one embodiment, each lineup includes one quarterback, two running backs, two wide receivers, one tight end, one flex position, one kicker, and one defense/special teams unit selected from the list of available players. The flex position may be selected from any other suitable position. For example, and without limitation, the flex may be an additional running back, wide receiver, or tight end. However, it will be appreciated that the flex position may be selected from any other position and remain within the scope of the present disclosure. Moreover, it will be appreciated that the lineup may be comprised with any suitable number of players selected from any suitable position(s) and remain within the scope of the present disclosure. The device may also permit replacement players or replacement lineups as previously discussed.

Once the lineups have been received (step 204), statistical information relating to each one of the fantasy players is received or collected (step 205). The statistical information may be received or collected from a statistical repository of an athletic league or a third-party source of statistical information. The statistical information may be any suitable statistical information relevant to a fantasy game. Such statistical information may include, without limitation, passing yardage, rushing yardage, receiving yardage, touchdowns, safeties, sacks, turnovers, interceptions, fumbles, etc.

Once the statistical information is received (step 205), the score for the lineup may be calculated (step 206). In calculating the score (step 206), any suitable scoring system may be employed. In one illustrative scoring system, every 25 yards passing is assigned 1-point, every 10 yards rushing or receiving is assigned 1-point, every touchdown is assigned 6-points, etc. It will, however, be appreciated that the forgoing scoring system is illustrative only and that any suitable scoring system may be employed and remain within the scope of the present disclosure. In one embodiment, the point totals for each player are added together to calculate a fantasy team score for the given round or period (e.g., week). The score calculations (step 206) may also include bonus scoring as previously discussed.

In one embodiment, the device may consider further input from one or more users in calculating a score. For example, and without limitation, the device may permit a user to replace one player in the original lineup with a previously designated bench or replacement player, where points for player from the original lineup are replaced by the points for the bench or replacement player. As will be discussed further below, in one embodiment, the bench or replacement player may be unavailable for use in a subsequent lineup. In another example, a user may selectively "bench" a player from another user's lineup where the selected player does not accrue fantasy points for statistics obtained during predetermined amount of time in the real-time sporting event upon which the collected statistics and fantasy points are based. For example, and without limitation, a user may choose to "bench" the quarterback of another user's lineup for one-half of a real-time football game whereby the statistics accumulated by the quarterback are ignored in calculating the quarterback's fantasy point total. It will be appreciated that the forgoing further input examples are illustrative only and not limiting in any way. Any other further input for the purposes of calculating points is expressly considered herein. Further, it will be appreciated that the forgoing further inputs are optional and embodiments not employing such inputs are expressly considered herein.

Once the scores for a given round or period are calculated (step 206), the device may then determine if the game will include a subsequent round or period (step 208). If there will be a subsequent round or period, the device may remove any previously used player from the list of available players for each user (step 210). The device may then provide a list of players available to each user (step 202) and the previously described process repeated. Since each lineup is unique to each user, the players removed from the list of available players (and, consequently, any subsequent list of available players) may be unique to each user.

If the device determines there is no subsequent round (step 208), the score from each period or round (from step 206) may be summed for each user (step 212). A winner may be determined based on who has the highest point total at the end of the game (step 214).

While the present disclosure has been described in connection with what is considered the most practical and preferred embodiment, it is understood that this disclosure is not limited to the disclosed embodiments, but is intended to cover various arrangements included within the spirit and scope of the broadest interpretation so as to encompass all such modifications and equivalent arrangements.

What is claimed is:

1. A fantasy sports game device comprising:
a memory configured to store a set of instructions; and
a processor configured to execute the set of instructions, wherein the set of instructions cause the processor to:
provide a first list of participating players to each user, wherein each user selects a first fantasy lineup, and wherein a player from the first list of participating players may be selected for more than one first fantasy lineup;
receive the first fantasy lineup from each user for a fantasy team for each user, the fantasy lineup comprising one or more players;
receive statistical information relating to each one of the players;
calculate a player point total for each player based at least in part on the received statistical information;
calculate a fantasy team score for the first fantasy lineup for each user by adding together the player point total for each player; and
receive a series of subsequent fantasy lineups from each user, the series having as few as one subsequent lineup,
wherein the set of instructions is configured to require any lineup in the series of subsequent lineups from an individual user to include only players not selected in any lineup previously selected by the individual user.

2. The device of claim 1 further comprising receiving a replacement lineup from each user comprising at least one player, wherein the replacement lineup is received after the first fantasy lineup is received and prior to the calculation of the player point total.

3. The device of claim 2 wherein the subsequent fantasy lineup does not include any of the players from the replacement lineup.

4. The device of claim 2 wherein, for the calculation of the player point total, the statistics of the first lineup are only considered up until the replacement lineup is received and wherein the statistics of the replacement lineup are only considered after the replacement lineup is received.

5. The device of claim 1 wherein the fantasy team score further includes bonus points based on the quality of the fantasy lineup.

6. The device of claim 1 wherein one or more players from the first lineup are selectively replaceable in a fantasy lineup by one or more bench players, wherein the point total for each of the bench players replaces the point total for one of the players from the first lineup.

7. The device of claim 1 wherein the fantasy team score total includes a bonus for any player breaking an existing league record.

8. The device of claim 1 wherein the fantasy team for each user is selectively registerable in a plurality of fantasy leagues.

9. The device of claim 8 wherein completing registration in the plurality of fantasy leagues is performed by clicking a button.

10. The device of claim 1 further comprising: provide for each lineup in the series of subsequent lineups a corresponding series of lists of remaining available players.

11. The device of claim 10 wherein the set of instructions removes participating players used by the individual user for each in the series of lists of remaining available players.

12. A fantasy sports game system comprising:
one or more participant terminals operable to act as a client on a network;
a computer operable to act as a server on the network and to communicate with each of the participant terminals over the network, the computer comprising:
a memory configured to store a set of instructions; and
a processor configured to execute the set of instructions, wherein the set of instructions cause the processor to:
provide a first list of participating players to each user, wherein each user selects a first fantasy lineup, and wherein a player from the first list of participating players may be selected for more than one first fantasy lineup;

receive the first fantasy lineup from each user for a fantasy team for each user from at least one participant terminal, the fantasy lineup comprising one or more players;

receive statistical information relating to each one of the players;

calculate a player point total for each player based at least in part on the received statistical information; and calculate a fantasy team score for the first fantasy lineup for each user by adding together the player point total for each player; and receive a series of subsequent fantasy lineups from each user from at least one participant terminal, the series having as few as one subsequent lineup,
wherein the set of instructions is configured to require any lineup in the series of subsequent lineups from an individual user to include only players not selected in any lineup previously selected by the individual user.

13. The system of claim 12 wherein each one of the players corresponds to a real-life athlete involved in a real-life athletic event.

14. The system of claim 13 wherein the athletic event is one or more football games.

15. The system of claim 14 wherein the fantasy lineup from each user comprises a quarterback, a running back, a wide receiver, a flex position, a kicker, and a defensive/special teams unit.

16. The system of claim 15 wherein the flex position is selected from a group comprising running back, wide receiver and tight end.

17. The system of claim 12 wherein at least one of the players is an athlete playing at least one position on an offensive squad of a football team, wherein the offensive squad positions are selected from a group comprising quarterback, running back, fullback, tailback, split end, tight end, wide receiver, and offensive lineman.

18. The system of claim 12 wherein at least one of the players is an athlete playing at least one position on a defensive squad of a football team, wherein the defensive squad positions are selected from a group comprising safety, cornerback, linebacker, defensive tackle, defensive end, and defensive lineman.

19. A fantasy sports game system comprising:
one or more participant terminals operable to act as a client on a network;
a computer operable to act as a server on the network and to communicate with each of the participant terminals over the network, the computer comprising:
a memory configured to store a set of instructions; and
a processor configured to execute the set of instructions, wherein the set of instructions cause the processor to:
provide a first list of available players to each user to at least one of the participant terminals,
wherein each user selects a first fantasy lineup, and
wherein selection of a player by a first user does not preclude a second user from also selecting the player;
receive the first fantasy lineup for each user for a fantasy team from each user from at least one participant terminal, the fantasy lineup comprising one or more players selected from the first list of available players;
calculate a first score for the fantasy lineup for each user comprising points, wherein the points are based at least in part on statistical information related to each selected player;
provide a subsequent list of available players to each user to at least one of the participant terminals, wherein the subsequent list of available players for an individual user does not include players from the received first fantasy lineup of the individual user; and
receive a subsequent fantasy lineup for the fantasy team from each user from at least one participant terminal, the fantasy lineup comprising one or more players selected from the subsequent list of available players, wherein none of the players of the first fantasy lineup for the individual user is included in any subsequent fantasy lineup of the individual user.

20. The system of claim 19 further comprising receiving one or more replacement players from the individual user, wherein the each replacement player replaces a corresponding player from at least one of the first fantasy lineup and the subsequent fantasy lineup.

21. The system of claim 20 wherein the first score includes points corresponding to statistics of the replacement players.

22. The system of claim 21 wherein the first score does not include points corresponding to the statistics of the player replaced from the first fantasy lineup.

23. The system of claim 21 wherein the first score includes points for only a portion of the statistics of the replacement players and wherein the first score includes points for only a portion of the statistics of the players replaced from the first fantasy lineup.

* * * * *